United States Patent
Xiong et al.

(10) Patent No.: US 11,579,504 B2
(45) Date of Patent: Feb. 14, 2023

(54) THIN FILM TRANSISTOR ARRAY SUBSTRATE AND DISPLAY PANEL USING SAME

(71) Applicant: Century Technology (Shenzhen) Corporation Limited, Shenzhen (CN)

(72) Inventors: Yuan Xiong, Shenzhen (CN); Chih-Chung Liu, New Taipei (TW); Qi Xu, Shenzhen (CN); Hui Wang, Shenzhen (CN); Ning Fang, Shenzhen (CN)

(73) Assignee: Century Technology (Shenzhen) Corporation Limited, Shenzhen (CN)

( * ) Notice: Subject to any disclaimer, the term of this patent is extended or adjusted under 35 U.S.C. 154(b) by 0 days.

(21) Appl. No.: 17/220,482

(22) Filed: Apr. 1, 2021

(65) Prior Publication Data

US 2022/0043289 A1 Feb. 10, 2022

(30) Foreign Application Priority Data

Aug. 7, 2020 (CN) .......................... 202010791395.7

(51) Int. Cl.
  *G02F 1/1368* (2006.01)
  *G02F 1/1362* (2006.01)
(52) U.S. Cl.
  CPC ...... *G02F 1/1368* (2013.01); *G02F 1/136286* (2013.01)
(58) Field of Classification Search
  CPC .................................................... G02F 1/1368
  See application file for complete search history.

(56) References Cited

U.S. PATENT DOCUMENTS

| | | | | |
|---|---|---|---|---|
| 10,481,454 B1 * | 11/2019 | Xiong | ............... | G02F 1/134363 |
| 2017/0082881 A1 * | 3/2017 | Wang | .................... | H01L 27/124 |
| 2018/0239210 A1 * | 8/2018 | Yabuki | .............. | G02F 1/133345 |
| 2021/0405483 A1 * | 12/2021 | Yang | ................ | G02F 1/136286 |

FOREIGN PATENT DOCUMENTS

| | | | | |
|---|---|---|---|---|
| CN | 103135300 | * | 6/2013 | .......... G02F 1/1362 |
| CN | 107678214 | * | 2/2018 | .............. G02F 1/13 |
| CN | 107678214 A | | 2/2018 | |
| CN | 112684931 | * | 4/2021 | ............. G06F 3/041 |
| TW | 202006449 A | | 2/2020 | |

\* cited by examiner

*Primary Examiner* — Sang V Nguyen

(74) *Attorney, Agent, or Firm* — ScienBiziP, P.C.

(57) ABSTRACT

A thin film transistor array substrate includes an insulating substrate, a plurality of data lines, a plurality of common electrodes, and a common electrode layer. The insulating substrate defines a plurality of sub-pixel area arranged into a sub-pixel array including a plurality of rows and a plurality of columns. The plurality of data lines extend in a direction of the columns in the sub-pixel array. The plurality of common electrodes extend in the direction of the columns in the sub-pixel array. At least two of the plurality of data lines are between adjacent common electrodes of the plurality of common electrodes, and the plurality of common electrodes are applied with a same voltage. The common electrode layer is on the insulating substrate and the common electrodes are connected to different locations of the common electrode layer.

18 Claims, 6 Drawing Sheets

THIN FILM TRANSISTOR ARRAY SUBSTRATE AND DISPLAY PANEL USING SAME

FIELD

The subject matter herein generally relates to displays, and particularly to a thin film transistor array substrate and a display panel including the thin film transistor array substrate.

BACKGROUND

A liquid crystal display (LCD) panel includes a thin film transistor array substrate, a color filter substrate, and a liquid crystal layer between the thin film transistor array substrate and the color filter substrate. A plurality of common electrodes and a plurality of pixel electrodes are on a surface of the thin film transistor array substrate. Voltage differences between the common electrodes and the pixel electrodes are applied to drive liquid crystal molecules in the liquid crystal layer to rotate.

Voltages at different positions on each common electrode need to be consistent when the display panel is operating. Different loads and other factors can cause deviations in voltages at different positions of each common electrode. A method for stabilizing the voltages at different positions on each common electrode is to add multiple conductive electrodes to the plurality of common electrodes on the thin film transistor array substrate. However, the above mentioned method increases an area of black matrix on the color filter substrate to cover the multiple conductive electrodes, but that decreases an aperture ratio of the display panel.

Therefore, there is room for improvement in the art.

BRIEF DESCRIPTION OF THE DRAWINGS

Implementations of the present disclosure will now be described, by way of embodiment, with reference to the attached figures.

DETAILED DESCRIPTION

Figure 1:
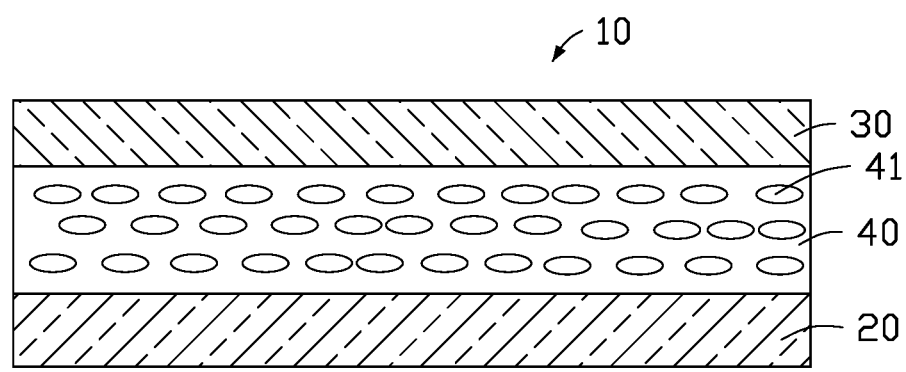
FIG. 1 is a cross-sectional view of a display panel including a thin film transistor array substrate and a color filter substrate, according to an embodiment of the disclosure.

It will be appreciated that for simplicity and clarity of illustration, where appropriate, reference numerals have been repeated among different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising" when utilized, means "including, but not necessarily limited to"; it specifically indicates open-ended inclusion or membership in the so-described combination, group, series, and the like.

FIG. 1 shows a liquid crystal display panel 10. The display panel 10 includes a thin film transistor array substrate 20, a color filter substrate 30 opposing the thin film transistor array substrate 20, and a liquid crystal layer 40 between the thin film transistor array substrate 20 and the color filter substrate 30. The liquid crystal layer 40 includes a plurality of liquid crystal molecules 41 densely arranged. The liquid crystal molecules 41 can rotate according to an electric field generated by the thin film transistor array substrate 20. The display panel 10 displays images according to rotation angles of each liquid crystal molecule 41.

Figure 2:
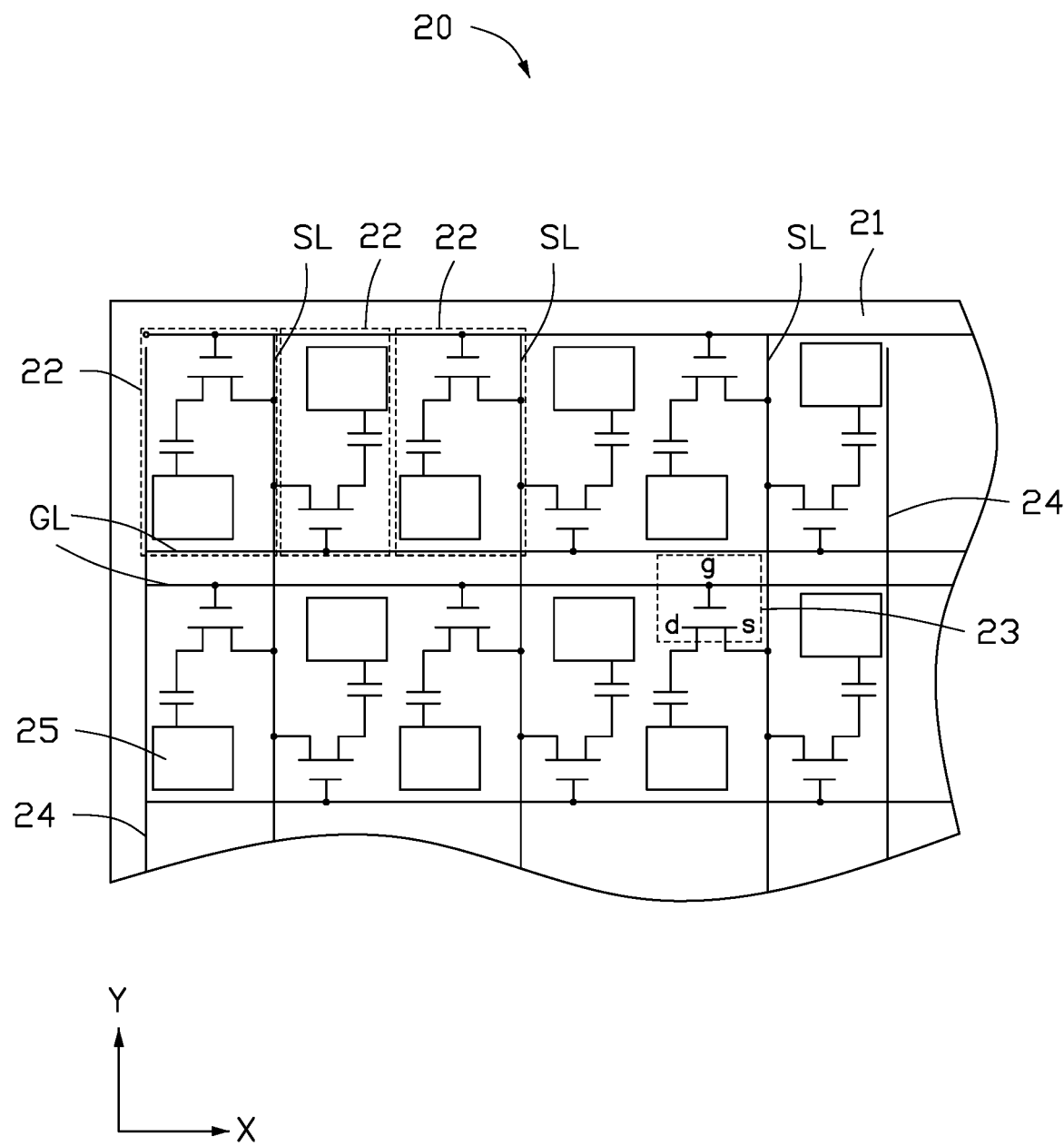
FIG. 2 is a planar view of the thin film transistor array substrate shown in FIG. 1.
Figure 3:
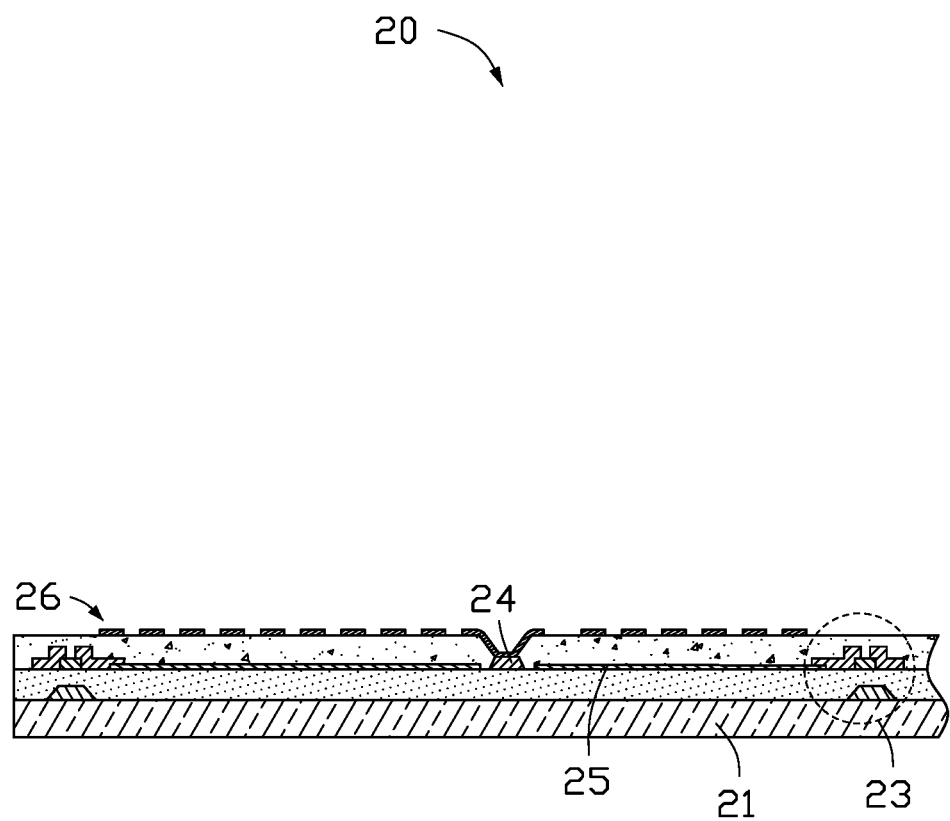
FIG. 3 is a cross-sectional view of the thin film transistor array substrate shown in FIG. 1.

FIG. 2 and FIG. 3 show the thin film transistor array substrate 20 including an insulating substrate 21. In the present embodiment, the insulating substrate 21 is a glass substrate. The insulating substrate 21 defines a plurality of sub-pixel areas 22 arranged as a sub-pixel array. The sub-pixel array includes a plurality of rows extending in an X direction and a plurality of columns extending in a Y direction. Every three adjacent sub-pixel areas 22 in a same row can emit light of different color. In the present embodiment, each three adjacent sub-pixel areas 22 emit red, green, and blue light. The X direction and the Y direction are perpendicular to each other in the present embodiment. The X direction and the Y direction intersect but the intersection in other embodiments may be other than at a right angle.

The thin film transistor array substrate 20 further includes a plurality of gate lines GL and a plurality of data lines SL on the insulating substrate 21. The gate lines GL and the data lines SL are insulated from each other and intersect, so defining the sub-pixel areas 22. In the present embodiment, the gate lines GL are in parallel with each other and extend in a row direction of the sub-pixel array (that is the X direction in FIG. 2), and the data lines SL are in parallel with each other and extend in a column direction (that is the Y direction as in FIG. 2) of the sub-pixel array.

The thin film transistor array substrate 20 further includes a plurality of thin film transistors 23 on the insulating substrate 21. Each sub-pixel area 22 is provided with one thin film transistor 23. The transistor 23 is a switching element of the sub-pixel area 22, being controlled to be on or off by a scan signal from a gate driver (not shown in the FIGS.). When the thin film transistor 23 is on, a data signal from a source driver (not shown in the figures) through the data line SL is written to each sub-pixel area 22 so that the display panel 10 displays images.

The thin film transistor array substrate 20 in the embodiment has a double-gate structure. There are two gate lines GL between adjacent rows of sub-pixel areas 22. Each thin film transistor 23 has a gate electrode "g", a source electrode "s", and a drain electrode "d". Each gate line GL electrically connects the gate electrode "g" of some thin film transistors 23 in the closer one of the two rows of sub-pixel areas 22. That is, sub-pixel areas 22 in a same row are divided into two groups, one group being electrically connected to the gate line GL on one side of the sub-pixel areas 22 of the row, and the other group being electrically connected to other gate line GL on other side of the row of sub-pixel areas 22. There are two columns of sub-pixel areas 22 between adjacent data lines SL. Each data line SL is electrically connected to the source electrode "s" of the thin film transistors 23 in two columns of sub-pixel areas 22 on either side of it. The drain electrode "d" of each thin film transistor 23 is electrically connected to one pixel electrode 25.

The thin film transistor array substrate 20 further includes a plurality of common electrodes 24 on the insulating substrate 21. The common electrodes 24 are spaced apart and extend along the column direction of the sub-pixel array. Each common electrode 24 is between adjacent columns of sub-pixel areas 22. At least two data lines SL are provided between every two common electrodes 24. In the present embodiment, there are three data lines SL and six sub-pixel areas 22 between every two common electrodes 24. As an example, only two common electrodes 24 and six columns of sub-pixel area 22 are shown in FIG. 2. One data line SL is between every adjacent sub-pixel area 22, or one common electrode 24 can be between every adjacent sub-pixel area 22. There may also be no data line SL and no common electrode 24 between every adjacent sub-pixel area 22.

The gate electrode "g" of each thin film transistor 23 is electrically connected to the nearest gate line GL. The source electrode "s" is electrically connected to the nearest data line SL and the drain electrode "d" is electrically connected to one pixel electrode 25. The thin film transistor array substrate 20 further includes a common electrode layer 26. A voltage difference of the common electrode layer 26 and each pixel electrode 25 generates an electric field causing rotation of the liquid crystal molecules in the liquid crystal layer 40.

The common electrode layer 26 is electrically connected to each common electrode 24. A single voltage is applied to each common electrode 24 when the display panel 10 is working, so that in theory the common electrode layer 26 has the same voltage as each common electrode 24, the common electrode layer 26 being electrically connected to each common electrode 24. The common electrodes 24 are connected to different positions of the common electrode layer 26, and the voltage applied to the common electrodes 24 is a single voltage. The common electrodes 24 apply the same voltage to different positions of the common electrode layer 26, this improves a voltage uniformity of the common electrode layer 26, and reduces if not cancels flickering of the display panel 10.

In the present embodiment, the common electrodes 24 are preferably uniformly arranged (the same number of data lines and the same number of columns of sub-pixel area 22 are between adjacent common electrodes 24), which improves voltage uniformity across the whole common electrode layer 26.

Figure 4:
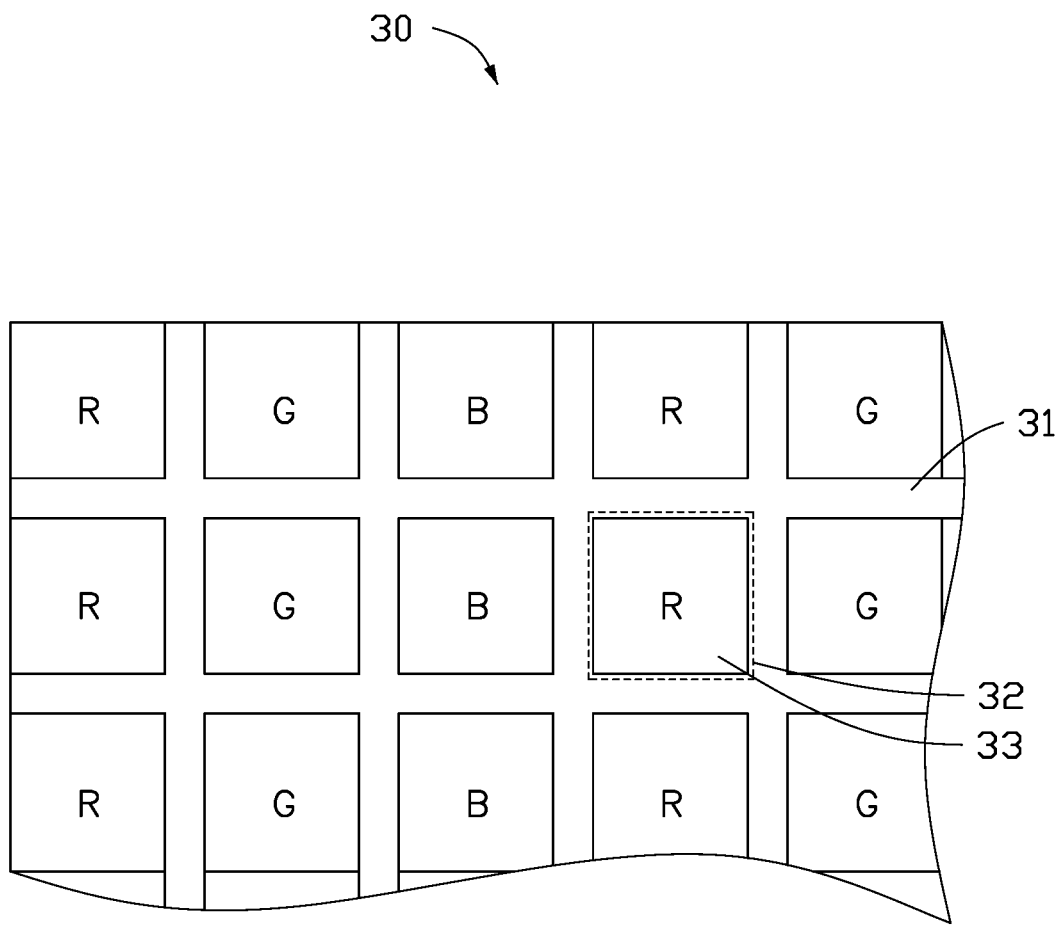
FIG. 4 is a planar view of the color filter substrate shown in FIG. 1.

FIG. 4 shows the color filter substrate 30 including a grid-like black matrix 31. The black matrix 31 is an insulator and is opaque. The black matrix 31 defines a plurality of filter areas 32. The color filter substrate 30 further includes a plurality of filters 33. Each filter area 32 is provided with a filter 33. An area corresponding to the black matrix 31 is not transparent or translucent, but an area corresponding to the filter areas 32 is transparent. A light transmittance of the display panel 10 is in direct proportion to the area of the filter areas 32. That is, a ratio is defined as the area size of the filter areas 32 to a total area size of the filter areas 32 and the black matrix 31, the higher the ratio can be, the greater will be an aperture ratio of the display panel 10.

The filter areas 32 are divided into one plurality of filter areas R for emitting red light, another plurality of filter areas G for emitting green light, and a third plurality of filter areas B for emitting blue light. Each p filter area 32 corresponds to the sub-pixel areas 22 on a one-to-one basis, the plurality of filter areas 32 being arranged as a filter array including a plurality of rows and a plurality of columns. In the present embodiment, the filter areas R, Q and B are arranged alternately in a direction of the row of the filter array (the same as the X direction shown in FIG. 2). Filter areas 32 in a single column emit light of one color.

Sub-pixel areas 22 which emit different colors of light may be arranged differently, and filter areas 32 emitting different colors of light may be arranged differently. Three adjacent sub-pixel areas 22 in a single column or in a single row emit different colors of light, and the adjacent three filter areas 32 in same column or same row emit different colors of light.

Figure 5:
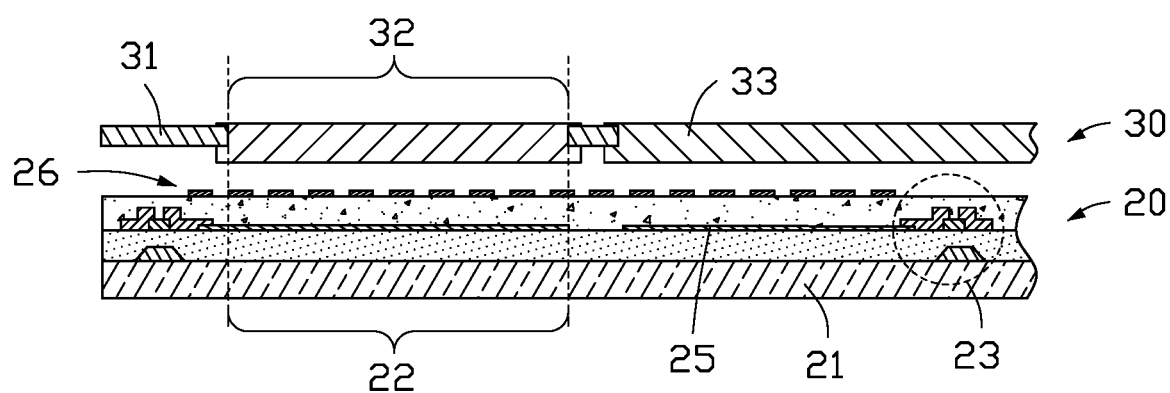
FIG. 5 is a cross-sectional view of part of the thin film transistor array substrate and the color filter substrate.

Referring to FIG. 5, a projection of each filter area 32 on the insulating substrate 21 coincides with one sub-pixel area 22 on the insulating substrate 21. Each filter 33 filters light from a sub-pixel area 22 corresponding to a filter area 32 in which the filter 33 is located.

In the present embodiment, the common electrode 24 is made of opaque metal material and is formed in a same process with the source electrode "s" and the drain electrode "d" of the plurality of thin film transistors 23, so the common electrode 24 is aligned with the black matrix 31. That is, a projection of the black matrix 31 on the thin film transistor array substrate 20 completely covers the common electrode 24.

Figure 6:
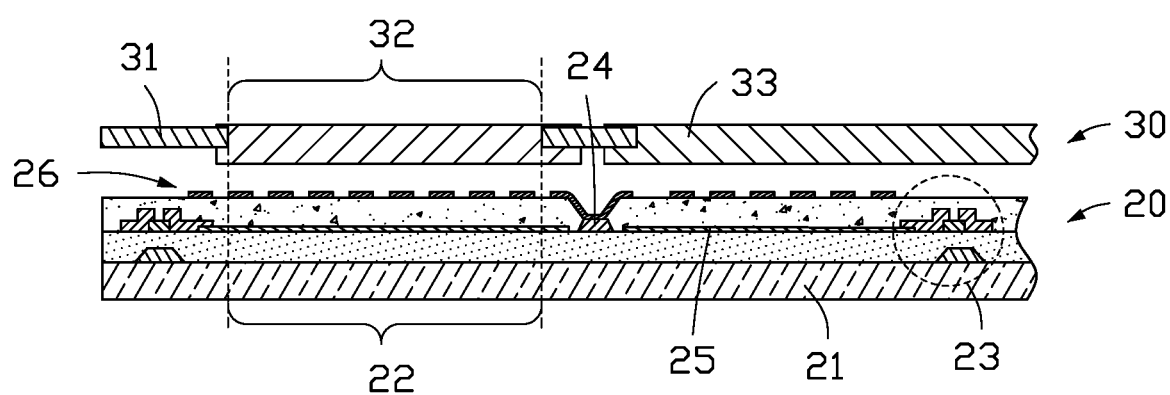
FIG. 6 is another cross-sectional view of part of the thin film transistor array substrate and the color filter substrate.

FIG. 5 is a cross-sectional view of the thin film transistor array substrate without the common electrode 24. FIG. 6 is a cross-sectional view of the thin film transistor array substrate with the common electrode 24 in position. According to FIG. 5 and FIG. 6, the black matrix 31 includes a first area with a first width and a second area with a second width. The first area corresponds to a position on the insulating substrate 21 without the common electrode 24, and the second area corresponds to a position on the insulating substrate 21 with the common electrode 24. The first width is smaller than the second width. The wider the black matrix 31, the smaller the aperture ratio. The arrangement of the common electrode 24 in the present embodiment (there being six sub-pixel areas 22 between each adjacent two common electrodes 24, or three data lines SL between each adjacent two common electrodes 24) is helpful to reduce a number of the common electrodes 24, which improves the voltage uniformity of the common electrode layer 26, further ensures that the display panel 10 has a higher aperture ratio and can effectively improve an image quality of the display panel 10.

It is to be understood, even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A thin film transistor array substrate comprising:

an insulating substrate, the insulating substrate defining a plurality of sub-pixel area arranged into a sub-pixel array comprising a plurality of rows and a plurality of columns;

a plurality of data lines on the insulating substrate, the plurality of data lines being spaced apart from each other, each of the plurality of data lines extending in a column direction of the sub-pixel array;

a plurality of common electrodes on the insulating substrate, the plurality of common electrodes being spaced apart from each other, each of the plurality of common electrodes extending in the column direction of the sub-pixel array, at least two of the plurality of data lines being between every two adjacent common electrodes of the plurality of common electrodes, and the plurality of common electrodes being applied with a same voltage; and a common electrode layer on the insulating substrate, the plurality of common electrodes being connected to different positions of the common electrode layer, wherein there are six of the plurality of sub-pixel areas and three of the plurality of data lines between every two adjacent common electrodes.

2. The thin film transistor array substrate of claim 1, further comprising:

a plurality of gate lines on the insulating substrate, the plurality of gate lines being spaced apart from each other, each of the plurality of gate lines being extending in a row direction of the sub-pixel array;

wherein the plurality of gate lines and the plurality of data lines are configured to cooperate with each other to display images.

3. The thin film transistor array substrate of claim 2, wherein the plurality of gate lines are perpendicular to each of the plurality of data lines.

4. The thin film transistor array substrate of claim 3, wherein there are two of the plurality of gate lines between every two rows of sub-pixel area.

5. The thin film transistor array substrate of claim 3, wherein there are two adjacent columns of sub-pixel areas between every two adjacent data lines.

6. The thin film transistor array substrate of claim 3, wherein numbers of columns of the sub-pixel area between every two adjacent common electrodes are the same.

7. The thin film transistor array substrate of claim 3, wherein there are a same number of data lines between every two adjacent common electrodes.

8. The thin film transistor array substrate of claim 7, wherein there are six of the plurality of sub-pixel areas and three of the plurality of data lines between every two adjacent common electrodes.

9. The thin film transistor array substrate of claim 1, wherein the plurality of common electrodes are made of metal.

10. A display panel, comprising:

a thin film transistor array substrate comprising:

an insulating substrate, the insulating substrate defining a plurality of sub-pixel area arranged into a sub-pixel array comprising a plurality of rows and a plurality of columns;

a plurality of data lines on the insulating substrate, the plurality of data lines being spaced apart from each other, each of the plurality of data lines extending in a column direction of the sub-pixel array;

a plurality of common electrodes on the insulating substrate, the plurality of common electrodes being spaced apart from each other, each of the plurality of common electrodes extending in the column direction of the sub-pixel array, at least two of the plurality of data lines being between every two adjacent common electrodes of the plurality of common electrodes, and the plurality of common electrodes being applied with a same voltage; and a common electrode layer on the insulating substrate, the plurality of common electrodes being connected to different positions of the common electrode layer; and a color filter substrate opposite to the thin film transistor array substrate and comprising a grid like black matrix, the black matrix defining a plurality of filter areas, the filter areas corresponding to the plurality of sub-pixel areas, and a projection of the black matrix on the thin film transistor array substrate covering the plurality of common electrodes;

wherein there are six of the plurality of sub-pixel areas and three of the plurality of data lines between every two adjacent common electrodes.

11. The display panel of claim 10, further comprising:

a plurality of gate lines on the insulating substrate, the plurality of gate lines being spaced apart from each other, each of the plurality of gate lines being extending in a row direction of the sub-pixel array;

wherein the plurality of gate lines and the plurality of data lines are configured to cooperate with each other to display images.

12. The display panel claim 11, wherein the plurality of gate lines are perpendicular to each of the plurality of data lines.

13. The display panel of claim 12, wherein there are two of the plurality of gate lines between every two rows of sub-pixel area.

14. The display panel of claim 12, wherein there are two adjacent columns of sub-pixel areas between every two adjacent data lines.

15. The display panel of claim 12, wherein numbers of columns of the sub-pixel area between every two adjacent common electrodes are the same.

16. The display panel of claim 12, wherein there are a same number of data lines between every two adjacent common electrodes.

17. The display panel of claim 16, wherein there are six of the plurality of sub-pixel areas and three of the plurality of data lines between every two adjacent common electrodes.

18. The display panel of claim 10, wherein the plurality of common electrodes are made of metal.

* * * * *